US012576338B2

(12) United States Patent
Kaji et al.

(10) Patent No.: US 12,576,338 B2
(45) Date of Patent: Mar. 17, 2026

(54) PROGRAM, METHOD, AND ELECTRONIC DEVICE FOR GAME

(71) Applicant: CYGAMES, INC., Tokyo (JP)

(72) Inventors: Yasuyuki Kaji, Tokyo (JP); Wataru Nishimine, Tokyo (JP); Toru Miki, Tokyo (JP); Satoshi Hirate, Tokyo (JP); Hirotsugu Yasui, Tokyo (JP); Takaya Nishii, Tokyo (JP); Takeshi Kasuya, Tokyo (JP); Hiroto Yanase, Tokyo (JP)

(73) Assignee: CYGAMES, INC., Tokyo (JP)

( * ) Notice: Subject to any disclaimer, the term of this patent is extended or adjusted under 35 U.S.C. 154(b) by 295 days.

(21) Appl. No.: 18/331,691

(22) Filed: Jun. 8, 2023

(65) Prior Publication Data

US 2023/0338855 A1 Oct. 26, 2023

Related U.S. Application Data

(63) Continuation of application No. PCT/JP2021/044464, filed on Dec. 3, 2021.

(30) Foreign Application Priority Data

Dec. 10, 2020 (JP) ................................. 2020-205036
Oct. 14, 2021 (JP) ................................. 2021-168704

(51) Int. Cl.
| | |
|---|---|
| *A63F 13/24* | (2014.01) |
| *A63F 13/58* | (2014.01) |
| *A63F 13/847* | (2014.01) |

(52) U.S. Cl.
CPC ............ *A63F 13/58* (2014.09); *A63F 13/847* (2014.09)

(58) Field of Classification Search
None
See application file for complete search history.

(56) References Cited

U.S. PATENT DOCUMENTS 8,690,654 B2 * 4/2014 Okamura ................ A63F 13/58
                                                                463/1
9,814,969 B2 * 11/2017 Tabata .................... A63F 13/45
(Continued)

FOREIGN PATENT DOCUMENTS

JP      2016-131630 A      7/2016
JP      2020-000735 A      1/2020

OTHER PUBLICATIONS

Utawarerumono Zan Official Guidebook, 1st Edition, Kadokawa Corp., Oct. 20, 2018, pp. 24, 28 (7 pages).
(Continued)

*Primary Examiner* — Sunit Pandya
(74) *Attorney, Agent, or Firm* — Osha Bergman Watanabe & Burton LLP

(57) ABSTRACT

Provided is a program for a game where a plurality of ally characters and an enemy character are made to battle with each other, the program causing an electronic device to execute: determining whether the enemy is in a special-attack target state where the enemy becomes a target of a special attack; setting the allies disposed within a predetermined range of the enemy in the game field, in a state of being able to execute the special attack, if in the special-attack target state; allowing the allies to execute the special attack in the state of being able to execute the special attack; determining whether the executed special attack succeeded; increasing correction points when the special attack succeeded; decreasing the correction points according to a period during which the correction points are not increased; and correcting parameters associated with the allies when the correction points satisfy a correction condition.

9 Claims, 10 Drawing Sheets

(56) References Cited

U.S. PATENT DOCUMENTS

| | | | |
|---|---|---|---|
| 11,701,591 B2 * | 7/2023 | Hasegawa ............. | A63F 13/795 |
| | | | 463/42 |
| 2013/0244740 A1 * | 9/2013 | Shimamura ........... | A63F 13/847 |
| | | | 463/2 |
| 2017/0291108 A1 * | 10/2017 | Kim ...................... | A63F 13/525 |

OTHER PUBLICATIONS

Kingdom Hearts 3D [Dream Drop Distance] Ultimania, Square Enix Co., Ltd., May 1, 2012, pp. 36-37 (7 pages).
Star Ocean 5—Integrity and Faithlessness—Official Complete Guide, Square Enix Co., Ltd., Apr. 23, 2016, pp. 112, 116-117 (8 pages).
Valkyrie Profile 2—Silmeria—, Weekly Famitsu, Mar. 3, 2006, p. 245 (5 pages).
Shadow Hearts II, Weekly Famitsu March 5 issue appendix, Enterbrain Inc., Mar. 5, 2004, p. 3 (4 pages).
Final Fantasy Tactics A2, Grimoire of Sealed Holes, Official Complete Guide, 1st Edition, Square Enix Co., Ltd., p. 388 (7 pages).
International Search Report issued in PCT/JP2021/044464 on Jan. 11, 2022 (3 pages).
Written Opinion of the International Searching Authority issued in PCT/JP2021/044464 on Jan. 11, 2022 (5 pages).
Office Action issued in the counterpart Japanese Patent Application No. 2020-205036, mailed on Jun. 10, 2021 (3 pages).
Office Action issued in the counterpart Japanese Patent Application No. 2021-168704, mailed on Jan. 11, 2022 (9 pages).
Office Action issued in the counterpart Japanese Patent Application No. 2021-168704, mailed on Jun. 15, 2022 (8 pages).
Office Action issued in the counterpart Japanese Patent Application No. 2021-168704, mailed on Oct. 17, 2022 (8 pages).

* cited by examiner

FIG.2

PROGRAM, METHOD, AND ELECTRONIC DEVICE FOR GAME

TECHNICAL FIELD

The present invention relates to a program etc., and particularly relates to a program etc. for a game to be executed at an electronic device that accepts player inputs.

BACKGROUND ART

Electronic devices that can execute games, such as game machines used at amusement arcades etc., home game machines, portable game machines, and smartphones, have become widespread, and a large number of games to be executed on such electronic devices have been released. In this kind of game, it is known that a plurality of ally players battle with an enemy character in cooperation with each other, thus making it possible to execute coordinated attacks (Patent Literature 1).

CITATION LIST

Patent Literature

Patent Literature 1: Japanese Unexamined Patent Application, Publication No. 2020-000735

SUMMARY OF INVENTION

Technical Problem

In such games, although great damage can be inflicted on an enemy character by coordinated attacks, motivation to perform more effective play for defeating the enemy character in cooperation with the ally characters cannot be sufficiently provided.

The present invention has been made in order to solve the above-described problem, and a primary object thereof is to provide a program etc. capable of enhancing the fun of a game.

Solution to Problem

In order to achieve the above-described object, according to one aspect, the present invention provides a program for a game in which a plurality of ally characters and an enemy character are disposed in a game field, the plurality of ally characters include a player character that is operated according to a player input and a character that cooperates with the player character to battle with the enemy character, correction points that are common to the whole of the plurality of ally characters are managed, and the plurality of ally characters and the enemy character are made to battle with each other, the program causing an electronic device to execute: a step of determining whether the enemy character is in a special-attack target state in which the enemy character becomes a target of a special attack; a step of setting the ally character that is disposed within a predetermined range of the enemy character in the game field, in a state of being able to execute the special attack, if the enemy character is in the special-attack target state; a step of allowing the ally character to execute the special attack in the state of being able to execute the special attack; a step of determining whether the executed special attack has succeeded; a step of increasing the correction points, which are common to the whole of the plurality of ally characters, in the case where the special attack has succeeded; a step of decreasing the correction points in accordance with a period during which the correction points are not increased; and a step of correcting parameters associated with the plurality of ally characters at a predetermined rate common to the whole of the plurality of ally characters, when the correction points satisfy a correction condition.

It is also possible that the correction condition includes conditions in multiple stages; and the step of correcting the parameters includes a step of correcting the parameters on the basis of a stage of the correction condition satisfied by the correction points.

It is also possible to further cause the electronic device to execute: a step of changing a special value that is set for the enemy character, when an attack on the enemy character by any of the ally characters has succeeded; and a step of transitioning the enemy character to the special-attack target state when the special value satisfies a special-attack target state transition condition, wherein, in the case where the enemy character is in the special-attack target state, the number of times each of the ally characters can execute the special attack is equal to or less than a predetermined number of times.

It is also possible that the step of changing the special value includes a step of increasing the amount of change in the special value in the case where, after an attack by one of the plurality of ally characters on the enemy character has succeeded, an attack by another one of the ally characters on the enemy character has succeeded within a predetermined period.

It is also possible that two or more enemy characters are disposed in the game field in the game; the special value is set for each of the enemy characters; and, in the step of changing the special value, if one of the two or more enemy characters is in the special-attack target state, even when an attack by any of the ally characters on any of the other enemy character(s) has succeeded, a change that makes the special value thereof satisfy the special-attack target state transition condition is not executed.

It is also possible to further cause the electronic device to execute: a step of determining, while the parameters associated with the plurality of ally characters are being corrected, whether the enemy character is in a second-special-attack target state in which the enemy character becomes a target of a second special attack; a step of setting the ally character that is disposed within a predetermined range of the enemy character in the game field, in a state of being able to execute the second special attack, if it is determined that that the enemy character is in the second-special-attack target state, in which the enemy character becomes a target of the second special attack; a step of allowing the ally character to execute the second special attack in the state of being able to execute the second special attack; a step of determining whether the executed second special attack has succeeded a predetermined number of times or more; and a step of correcting a parameter associated with the enemy character in the case where it is determined that the second special attack has succeeded the predetermined number of times or more.

According to another aspect, the present invention provides a method for a game in which a plurality of ally characters and an enemy character are disposed in a game field, the plurality of ally characters include a player character that is operated according to a player input and a character that cooperates with the player character to battle with the enemy character, correction points that are common to the whole of the plurality of ally characters are managed, and the plurality of ally characters and the enemy character are made to battle with each other, the method causing an electronic device to execute: a step of determining whether the enemy character is in a special-attack target state in which the enemy character becomes a target of a special attack; a step of setting the ally character that is disposed within a predetermined range of the enemy character in the game field, in a state of being able to execute the special attack, if the enemy character is in the special-attack target state; a step of allowing the ally character to execute the special attack in the state of being able to execute the special attack; a step of determining whether the executed special attack has succeeded; a step of increasing the correction points, which are common to the whole of the plurality of ally characters, in the case where the special attack has succeeded; a step of decreasing the correction points in accordance with a period during which the correction points are not increased; and a step of correcting parameters associated with the plurality of ally characters at a predetermined rate common to the whole of the plurality of ally characters, when the correction points satisfy a correction condition.

According to still another aspect, the present invention provides an electronic device for a game in which a plurality of ally characters and an enemy character are disposed in a game field, the plurality of ally characters include a player character that is operated according to a player input and a character that cooperates with the player character to battle with the enemy character, and the plurality of ally characters and the enemy character are made to battle with each other, the electronic device managing correction points that are common to the whole of the plurality of ally characters; determining whether the enemy character is in a special-attack target state in which the enemy character becomes a target of a special attack; setting the ally character that is disposed within a predetermined range of the enemy character in the game field, in a state of being able to execute the special attack, if the enemy character is in the special-attack target state; allowing the ally character to execute the special attack in the state of being able to execute the special attack; determining whether the executed special attack has succeeded; increasing the correction points, which are common to the whole of the plurality of ally characters, in the case where the special attack has succeeded; decreasing the correction points in accordance with a period during which the correction points are not increased; and correcting parameters associated with the plurality of ally characters at a predetermined rate common to the whole of the plurality of ally characters, when the correction points satisfy a correction condition.

According to still another aspect, the present invention provides a program for a game in which a plurality of ally characters and an enemy character are disposed in a game field, the plurality of ally characters include a player character that is operated according to a player input and a character that cooperates with the player character to battle with the enemy character, correction points that are common to the whole of the plurality of ally characters are managed, and the plurality of ally characters and the enemy character are made to battle with each other, the program causing an electronic device to execute: a step of determining whether the enemy character is in a special-attack target state in which the enemy character becomes a target of a special attack; a step of setting the ally character that is disposed within a predetermined range of the enemy character in the game field, in a state of being able to execute the special attack, if the enemy character is in the special-attack target state; a step of allowing the ally character to execute the special attack in the state of being able to execute the special attack; a step of determining whether the executed special attack has succeeded a predetermined number of times or more; and a step of correcting a parameter associated with the enemy character in the case where it is determined that the special attack has succeeded the predetermined number of times or more.

Advantageous Effects of Invention

According to the present invention, it is possible to enhance the fun of the game by enabling an effective play for defeating an enemy character in cooperation with an ally character(s).

BRIEF DESCRIPTION OF DRAWINGS

FIG. 2 is a hardware configuration diagram of the system according to the embodiment of the present invention.

DESCRIPTION OF EMBODIMENT

A game system 1 according to an embodiment of the present invention will be described below with reference to the accompanying drawings. In this specification, for convenience of description, there are cases where descriptions that are more detailed than necessary are omitted. For example, there are cases where detailed descriptions of matters that are already well known and repeated descriptions of substantially the same configurations are omitted.

Figure 1:
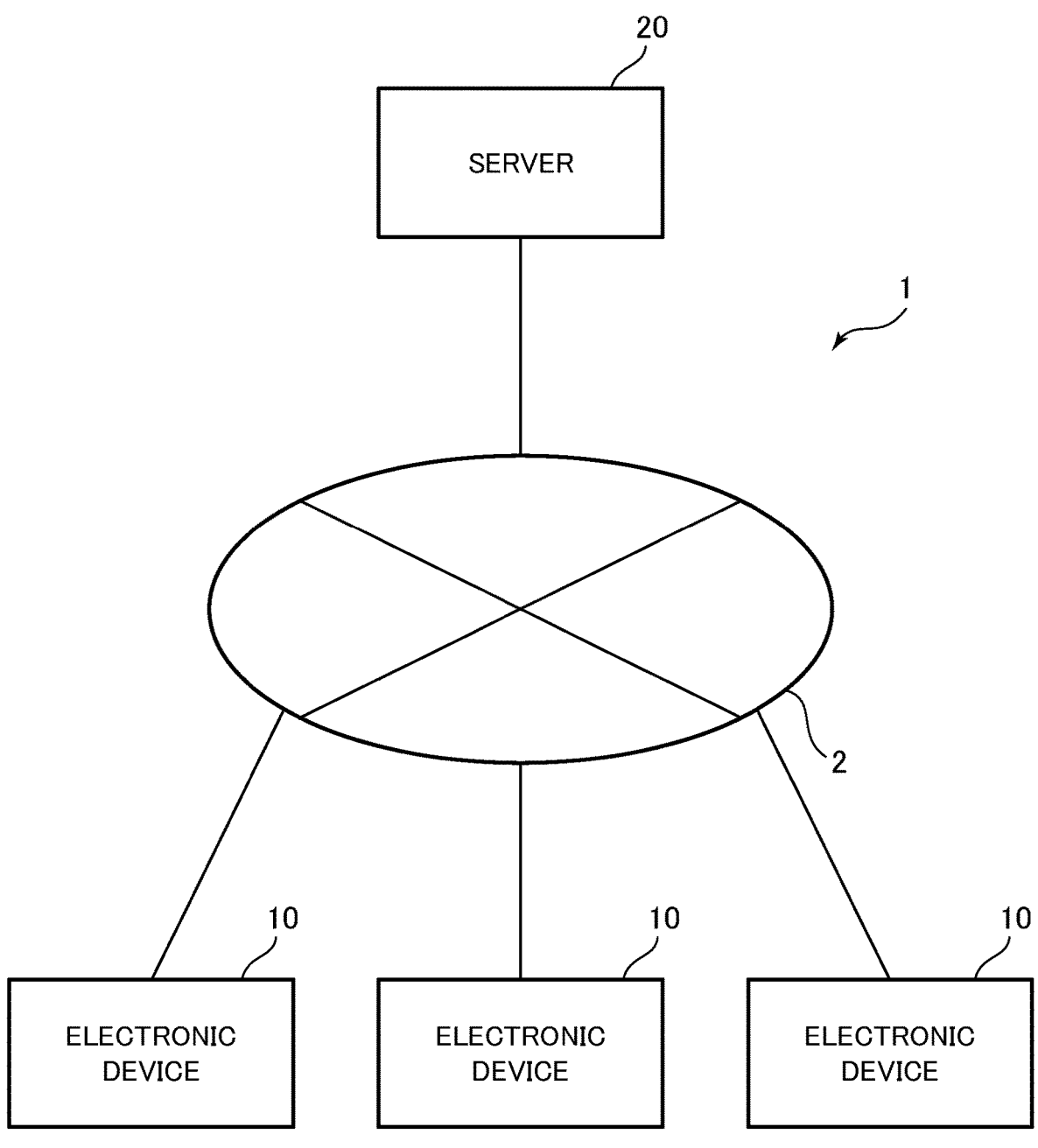
FIG. 1 is a view showing the overall configuration of a system according to one embodiment of the present invention.

FIG. 1 shows one example of the overall configuration of the game system according to the embodiment of the present invention. As shown in FIG. 1, the game system 1 includes a plurality of electronic devices 10 and a server 20, and the electronic devices 10 and the server 20 are connected to a network 2, such as the Internet, so as to be able to communicate with each other. Note that, although a description will be given on the assumption that the game system 1 of this embodiment is a server/client system that includes the plurality of electronic devices 10, the game system may include one electronic device 10, can be realized by a peer-to-peer system that does not need the server 20, or can be realized by a stand-alone system that is configured of one electronic device.

Figure 2:
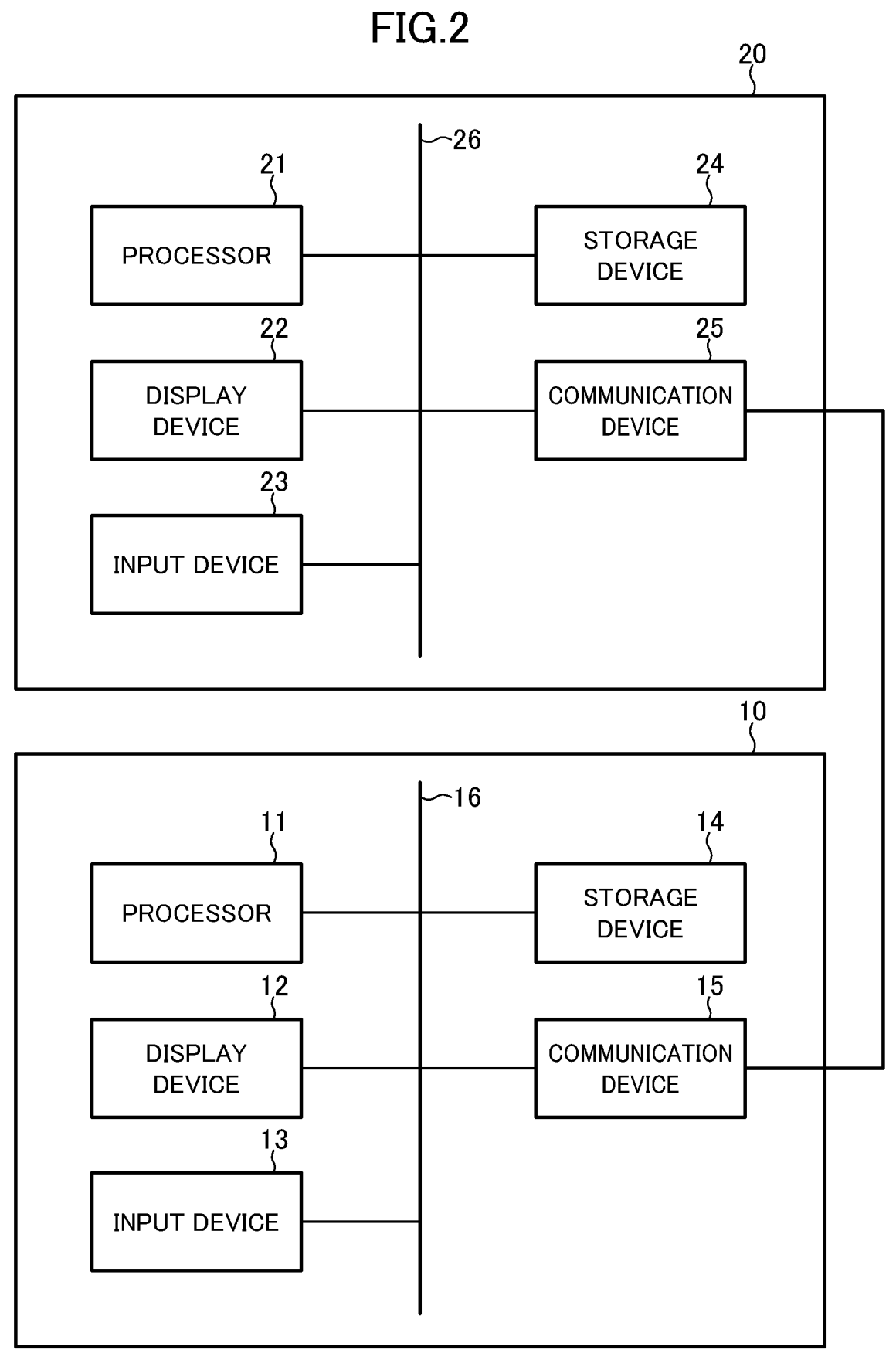

FIG. 2 is a block diagram showing the hardware configurations of each of the electronic devices 10 and the server 20 according to the embodiment of the present invention. The electronic device 10 includes a processor 11, a display device 12, an input device 13, a storage device 14, and a communication device 15. These individual constituent devices are connected via a bus 16. Note that it is assumed that interfaces are interposed as needed between the bus 16 and the individual constituent devices. In this embodiment, the electronic device 10 is a home game machine for executing a game. Alternatively, the electronic device 10 can be a terminal device such as a smartphone, a tablet computer, or a computer, as long as the terminal device includes the configuration described above.

Similarly, the server 20 includes a processor 21, a display device 22, an input device 23, a storage device 24, and a communication device 25. These individual constituent devices are connected via a bus 26. Note that it is assumed that interfaces are interposed as needed between the bus 26 and the individual constituent devices. In this embodiment, the server 20 is realized by a computer.

The processors 11 and 21 control the overall operations at the electronic device 10 and the server 20, respectively, and are, for example, CPUs. Note that electronic circuits such as MPUs may also be used as the processors 11 and 21. The processors 11 and 21 execute various kinds of processing by loading and executing programs and data stored in the storage devices 14 and 24, respectively. In one example, the processors 11 and 21 are each configured of a plurality of processors.

The display devices 12 and 22 display application screens etc. to a user (player) of the electronic device 10 and a user (administrator) of the server 20 according to control of the processors 11 and 21, respectively. The display devices 12 and 22 may be of any types, such as liquid crystal displays, displays using organic EL, and plasma displays, as long as the display devices can display information to the users.

The input devices 13 and 23 are user interfaces for accepting inputs from the users to the electronic device 10 and the server 20, and are, for example, controllers, touchscreens, touchpads, keyboards, or mouses. In this embodiment, since the electronic device 10 is a game machine, the electronic device 10 includes a game-machine controller as the input device 13, and a liquid crystal television is used as the display device 22. It is also possible that a liquid crystal display is used as the display device 12 so as to be integrated with the electronic device 10 and that the display device 12 and the input device 13 are further integrated with each other. Since the server 20 is a computer, it is assumed that the server 20 includes a keyboard and a mouse as the input device and includes a liquid crystal display as the display device.

The storage devices 14 and 24 are storage devices included in general smartphones and computers, such as magnetic storage devices and storage devices that use RAMS, which are volatile memories, and flash memories, which are non-volatile memories, such as eMMCs, UFSs, or SSDs. The storage devices 14 and 24 may also include external memories. For example, the storage device 14 stores a game program and a browser program, and the storage device 24 stores a server game program. The game program and the browser program are activated in accordance with user operations with respect to the electronic device 10 and are executed on an operating system (OS)

implemented in advance in the electronic device 10. The server game program includes functions and various kinds of data for performing information processing so as to properly proceed with games on the game program and the browser program executed at each player terminal serving as a client. Furthermore, it is also possible to use a database(s) physically separated from the electronic devices 10 and the server 20, as the storage device(s).

The communication devices 15 and 25 send data to and receive data from other devices via the network 2 (not shown in FIG. 2). For example, the communication devices 15 and 25 perform mobile communication or wireless communication, such as that using a wireless LAN, to connect to the network 2. The electronic device 10 uses the communication device 15 to communicate with the server 20 via the network. The communication devices 15 and 25 may perform wired communication using an Ethernet (registered trademark) cable or the like.

Figure 3:
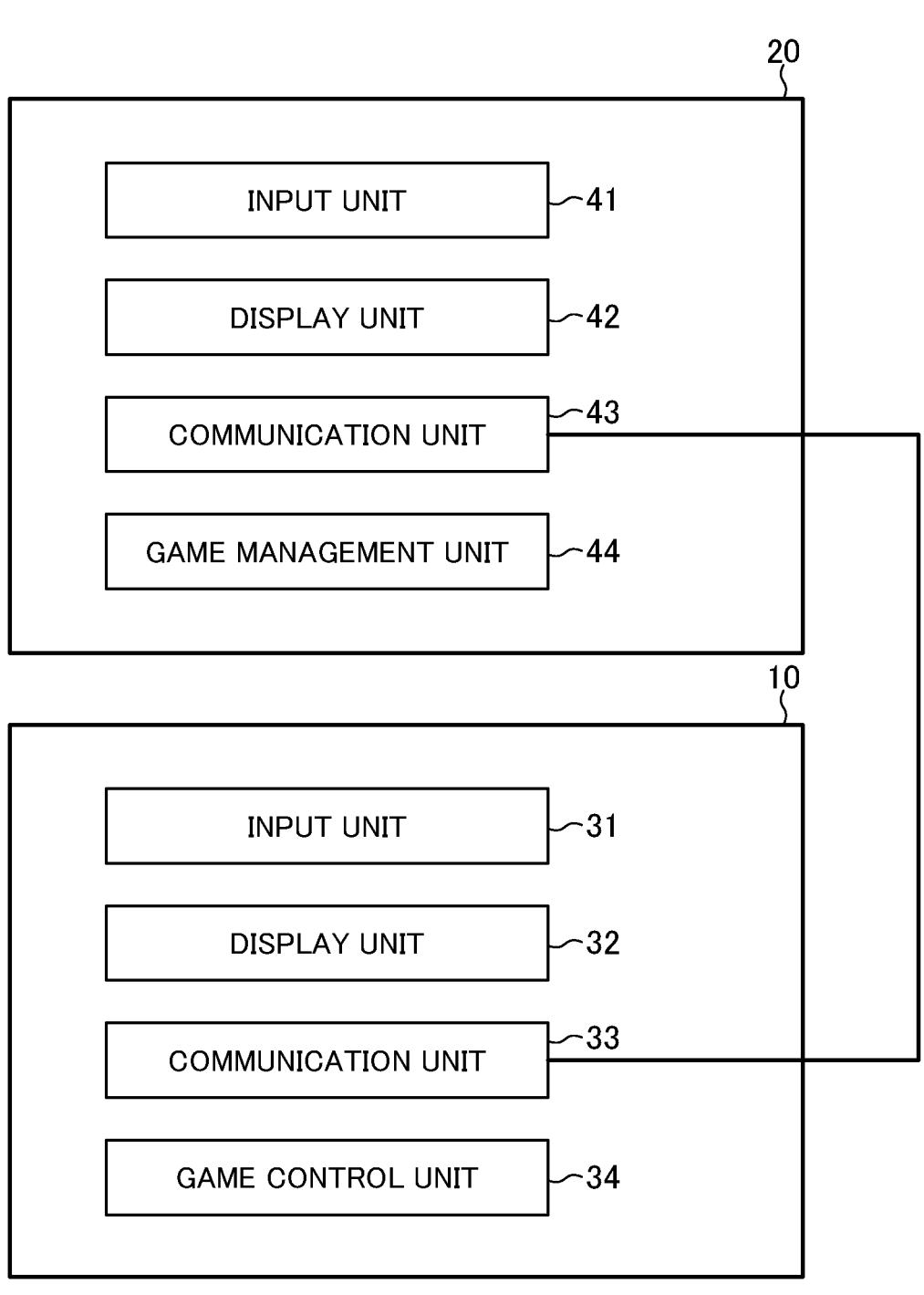
FIG. 3 is a functional block diagram of the system according to the embodiment of the present invention.

FIG. 3 shows one example of a functional block diagram of the electronic device 10 and the server 20 according to the embodiment of the present invention. The electronic device 10 includes an input unit 31, a display unit 32, a communication unit 33, and a game control unit 34, and the server 20 includes an input unit 41, a display unit 42, a communication unit 43, and a game management unit 44. In this embodiment, these functions are realized when the processors 11 and 21 execute programs. For example, the executed programs are the game program and a game management program stored in the storage devices 14 and 24. Since the various kinds of functions are realized by loading the programs, as described above, a portion or the entirety of one part (function) may be included in another part. Alternatively, these functions may be realized by means of hardware by configuring electronic circuits or the like each realizing a portion or the entirety of each of the functions.

The input units 31 and 41 are configured by using the input devices 13 and 23, respectively, and accept inputs from the users to the electronic device 10 and the server 20. The electronic device 10 and the server 20 accept user inputs by means of the input units 31 and 41.

The display unit 32 displays a game screen including a game field on the display device 12 and displays game screens in accordance with the proceeding of the game and user operations. The display unit 42 displays a management screen for a game administrator as needed on the display device 22.

The game control unit 34 performs control processing for executing the game of this embodiment and stores information such as various parameters. The game management unit 44 performs processing for management of the game executed at the electronic device 10 of this embodiment and stores information such as various parameters. In one example, when a game application is executed at the electronic device 10, the game management unit 44 sends data thereto and receives data therefrom regularly or as needed, to proceed with the game. For example, the game management unit 44 stores various kinds of setting information, history information, etc. required for the game executed at the electronic device 10 and appropriately provides such information to the electronic device 10.

In the case of a multiplayer game that proceeds through cooperation of a plurality of players, data related to player's proceeding of the game is provided to the electronic devices 10 of the other players. The game control unit 34 of each of the electronic devices 10 proceeds with the game on the basis of the game state of the electronic device 10 itself and the game states sent from the other electronic devices 10.

For example, in this embodiment, when accepting a game start input from a player via the input unit 31, the game control unit 34 sends a game start request including a player identifier to the game management unit 44. The game management unit 44 generates and stores parameters required to execute the game and sends a game start permission signal including necessary data to the electronic device 10. In the case where participation of the other players who are the users of the other electronic devices 10 is permitted, the game management unit 44 may send game start permission signals after receiving game participation requests from the other electronic devices 10.

The parameters required to start the game include, for example, data that defines a game field, data that defines initial positions of individual characters, etc. The data that defines a game field can be data that defines a game field selected by one of the players from among a plurality of game fields prepared in advance. Furthermore, data about game fields is stored in advance in the game control units 34 of the individual electronic devices 10, and the game management unit 44 may include game-field identification information indicating the game field selected by the player, in the game start permission signals to be sent to the other electronic devices 10. The initial positions of individual characters may be decided by the game management unit 44 and may be sent to the individual electronic devices 10, or such information decided by the individual electronic devices 10 may be sent to all the electronic devices 10 via the game management unit 44.

The parameters required to start the game can further include attacking powers, defensing powers, hit points, and states of ally characters and an enemy character. Furthermore, in this embodiment, it is assumed that information indicating a special value is included as a parameter of the enemy character. The special value is changed when an attack on the enemy character by any of the ally characters succeeds. In this embodiment, although the attack is a normal attack, the special value may also be changed by another attack such as a secret attack.

The state of the enemy character includes a normal state and a special-attack target state, and, when the special value satisfies a special-attack target state transition condition, the state of the enemy character is transitioned from the normal state to the special-attack target state. For example, when the enemy character is attacked a fixed number of times or more, the enemy character becomes unconscious, which expresses that the enemy character is set in a state in which the enemy character could receive a special attack. In a game screen, a production in which the enemy character becomes unconscious and stumble may be expressed. The state of the enemy character may also include another state such as that in which a powerful attack is executable.

The state of each of the ally characters can include a normal state, a special-attack executable state, and a secret-attack executable state. The state of the ally character is transitioned to the special-attack executable state when the ally character satisfies a predetermined condition, and is transitioned to the secret-attack executable state when the ally character satisfies another predetermined condition.

Furthermore, the parameters can include correction points and a correction level that are parameters associated with the whole of the ally characters and are common to all the ally characters. The correction points are points used to decide whether to correct the parameters such as the attacking powers etc. of the ally characters, and the correction level indicates a stage in which the parameters are corrected. The other parameters will be appropriately described as needed.

Here, it is assumed that actions of non-player characters are decided by the game management unit 44. The various parameters change according to the proceeding of the game based on information indicating actions of the player characters decided by player inputs and actions of the non-player characters, are appropriately decided by the game control units 34 and the game management unit 44, and are appropriately sent to the individual electronic devices 10 and the server 20 via the network, whereby it is possible to synchronize the game proceeding state among the plurality of electronic devices 10.

When the game start permission signals are received, the game control units 34 start the game after arranging the plurality of ally characters and the enemy character in the game field on the basis of data that defines the game field and data that defines the initial positions of the individual characters. The plurality of ally characters include: player characters that are operated by player inputs from the players who are the users of the electronic devices 10; and other ally characters that battle with the enemy character in cooperation with these player characters. Here, the enemy character is a non-player character that is controlled independently of player inputs, and the ally characters are player characters that are controlled by inputs from the players who are the users of the electronic devices 10. The enemy character and the ally characters may be player characters that are operated by the other players, may be non-player characters, or may be a combination of the player character(s) and the non-player character(s).

When the game is started, the game control units 34 control actions of the respective player characters on the basis of inputs from the players, and send information indicating the actions of the player characters to the game management unit 44. The information indicating the actions of the player characters may be player inputs themselves. In the case where one electronic device 10 includes a plurality of controllers, and a plurality of players play the game at the same time by using those controllers, the game control unit 34 of the one electronic device 10 controls, on the basis of player inputs from the individual players, the corresponding player characters.

The game management unit 44 of the server 20 decides an action of the non-player character, including the enemy character, and sends, to the individual electronic devices 10, information indicating the decided action of the non-player character and the actions of the player characters received from the electronic devices 10. The game control unit 34 of each of the electronic devices 10 displays an image that expresses the game field including the actions of the individual player characters and the enemy character, on the display unit 32 of the electronic device 10 on the basis of a player input to this electronic device 10 and the received information indicating the actions of the enemy character and the other player characters. The actions include movement, a normal attack, a special attack, a secret attack, etc.

After an attack on the enemy character by one ally character of the plurality of ally characters succeeds, when an attack on the enemy character by another ally character thereof succeeds within a predetermined period, the amount of change in the special value can be increased. Through cooperation with the ally character(s), the enemy character can be more effectively brought to the special-attack target state, whereby the pleasure of making a strategic cooperation can be provided.

The game control units 34 determine whether the enemy character is in the special-attack target state, in which the enemy character is the target of a special attack. If the enemy character is in the special-attack target state, the ally character that is located within a predetermined range of the enemy character in the game field is set to a state of being able to execute a special attack, and the special attack is executed by the ally character. Then, it is determined whether the executed special attack succeeds, and, if the special attack succeeds, the correction points are increased. The correction points are decreased in accordance with a period during which the correction points are not increased. When the correction points satisfy a correction condition, the parameters associated with the ally characters are corrected. The correction condition includes conditions in multiple stages, and, in a stage in which the parameters are corrected, the parameters can be corrected on the basis of the stage of the correction condition satisfied by the correction points.

In one embodiment, two or more enemy characters can be disposed in the game field. In this case, the special value is set for each of the enemy characters, and, when one of the two or more enemy characters is in the special-attack target state, even if an attack by any of the ally characters on any of the other enemy character(s) succeeds, it is possible that a change that makes the special value of the any of the other enemy character(s) satisfy the special-attack target state transition condition is not executed.

The function of the game control unit 34 of each of the electronic devices 10 and the function of the game management unit 44 of the server 20, which are described in this specification, may also be included in the opposite units; all of the functions may also be included in only one of the units; or at least part of the functions is included in both of the units in a redundant manner, and, when the results of processing need to be adjusted, the priority may be placed on one of the execution results, for example, on the execution result of the game management unit 44. The same applies to all processing procedures described in this specification.

Figure 4:
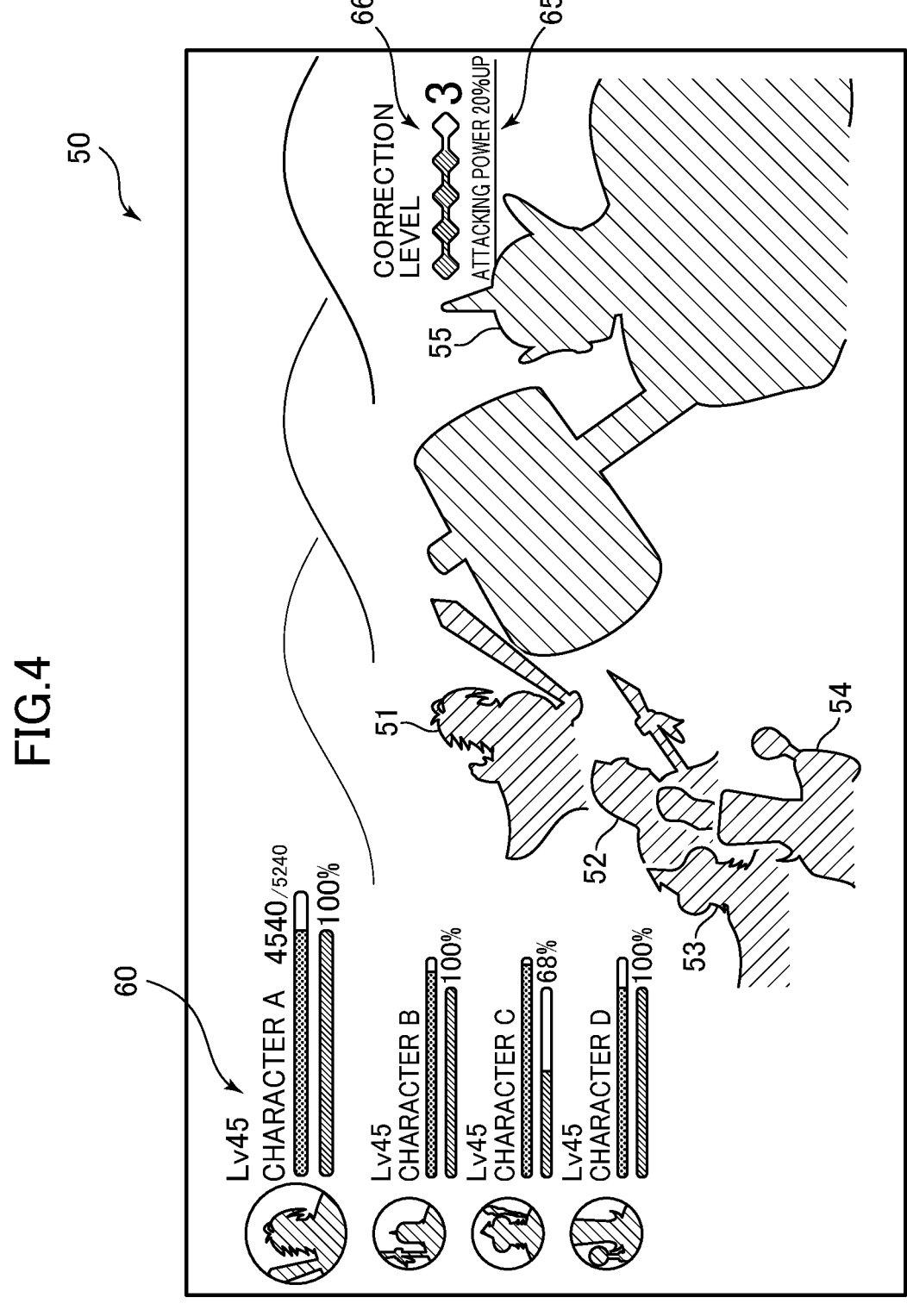
FIG. 4 shows an example of a game screen according to the embodiment of the present invention.

FIG. 4 is a view showing one example of the game screen. The game control unit 34 of each of the electronic devices 10 displays an image expressing part of the game field, as a game screen 50, on the display unit 32 on the basis of the positions of characters, disposed in the game field, of the players of the electronic devices 10. Here, ally characters 51 to 54 and an enemy character 55 are disposed in the game field. The ally character 51 is a player object that is an object acting in the game field on the basis of inputs from the player who is the user of this electronic device 10. Here, it is assumed that the ally characters 52 to 54 are player objects controlled on the basis of inputs from the other players.

An ally-character information region 60 includes the level, the name, the remaining hit points (HP), and the secret gauge of each of the ally characters. The secret gauge is increased when an attack on the enemy character succeeds, for example, and, when the secret gauge reaches a fixed value (for example, 100%), the secret attack, which is a powerful attack, can be executed. Furthermore, after one ally character succeeds in the secret attack, when another ally character succeeds in the secret attack within a certain period, it is possible to execute an additional secret attack due to the consecutive secret attacks and to inflict bonus damage. With the additional secret attack, larger damage may be inflicted as the number of consecutively executed secret attacks becomes larger.

A correction information region 65 includes: a gauge 66 indicating correction points and a correction level; and parameter correction information. The correction information region 65 indicates the correction points and the correction level decided on the basis of the correction points and indicates the content of correction given to the parameters according to the current correction level.

Figure 5:
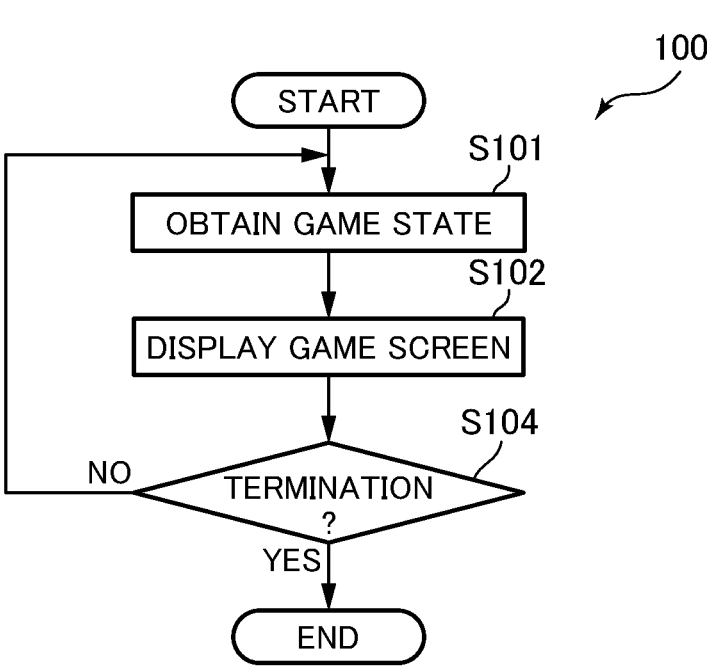
FIG. 5 is a flowchart showing image display processing according to the embodiment of the present invention.
Figure 6:
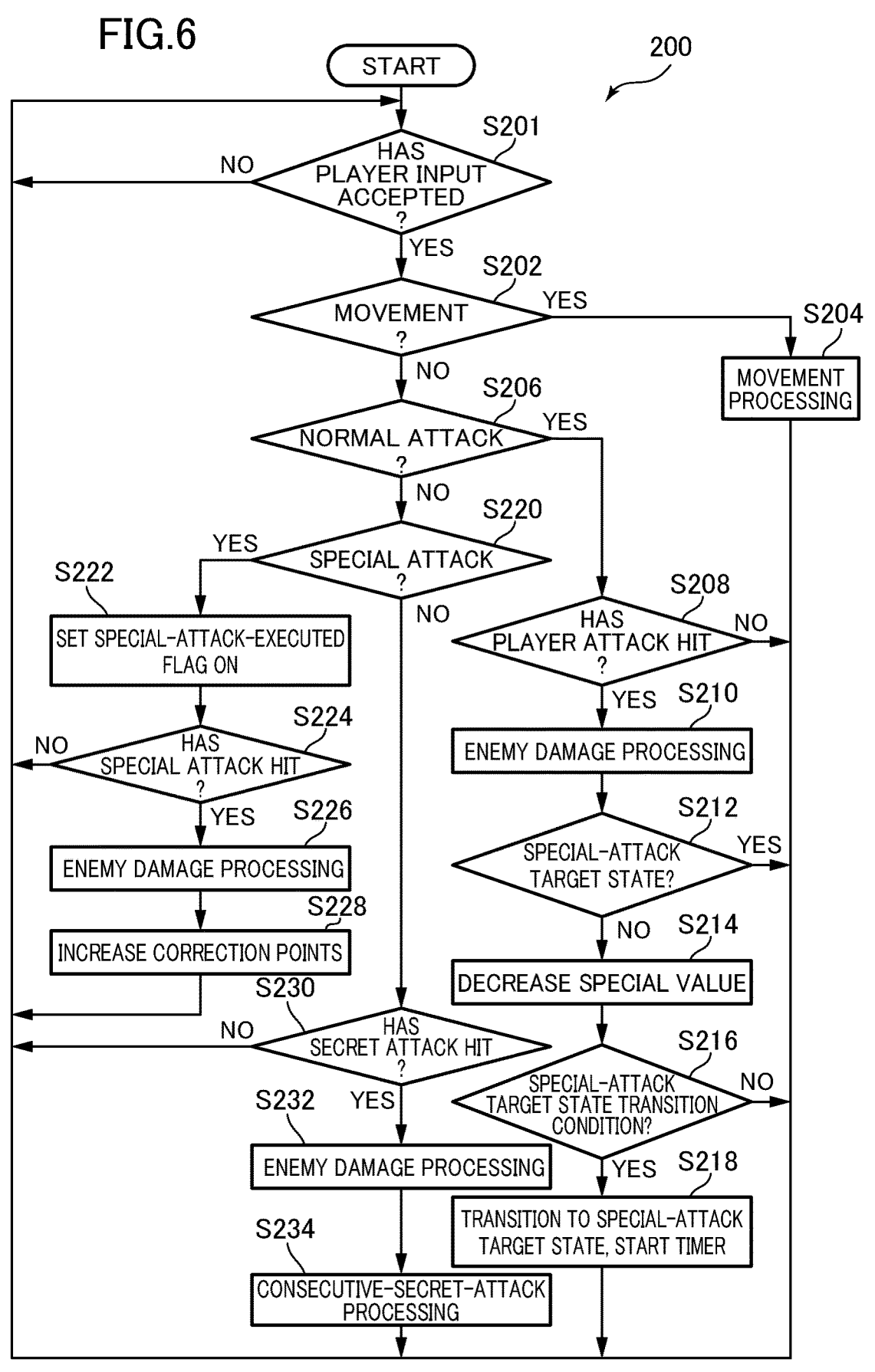
FIG. 6 is a flowchart showing player-character control processing according to the embodiment of the present invention.
Figure 7:
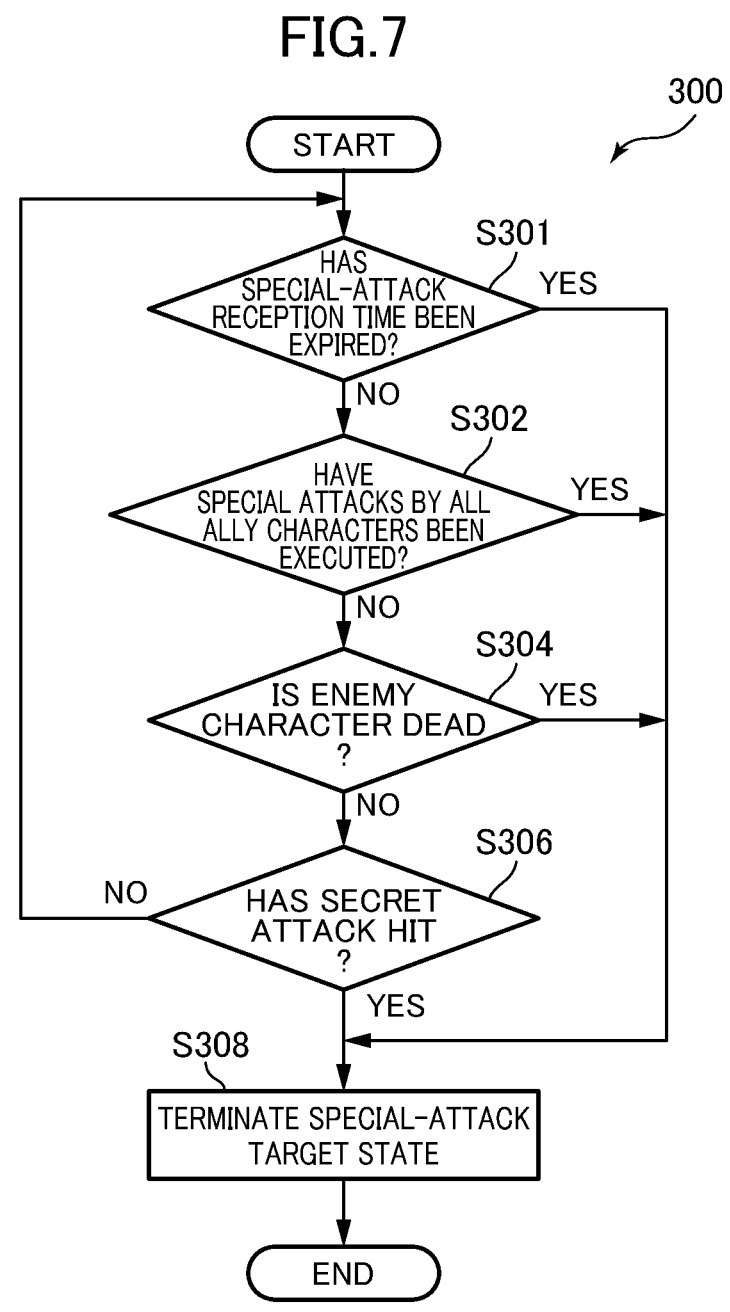
FIG. 7 is a flowchart showing special-attack target state management processing according to the embodiment of the present invention.
Figure 8:
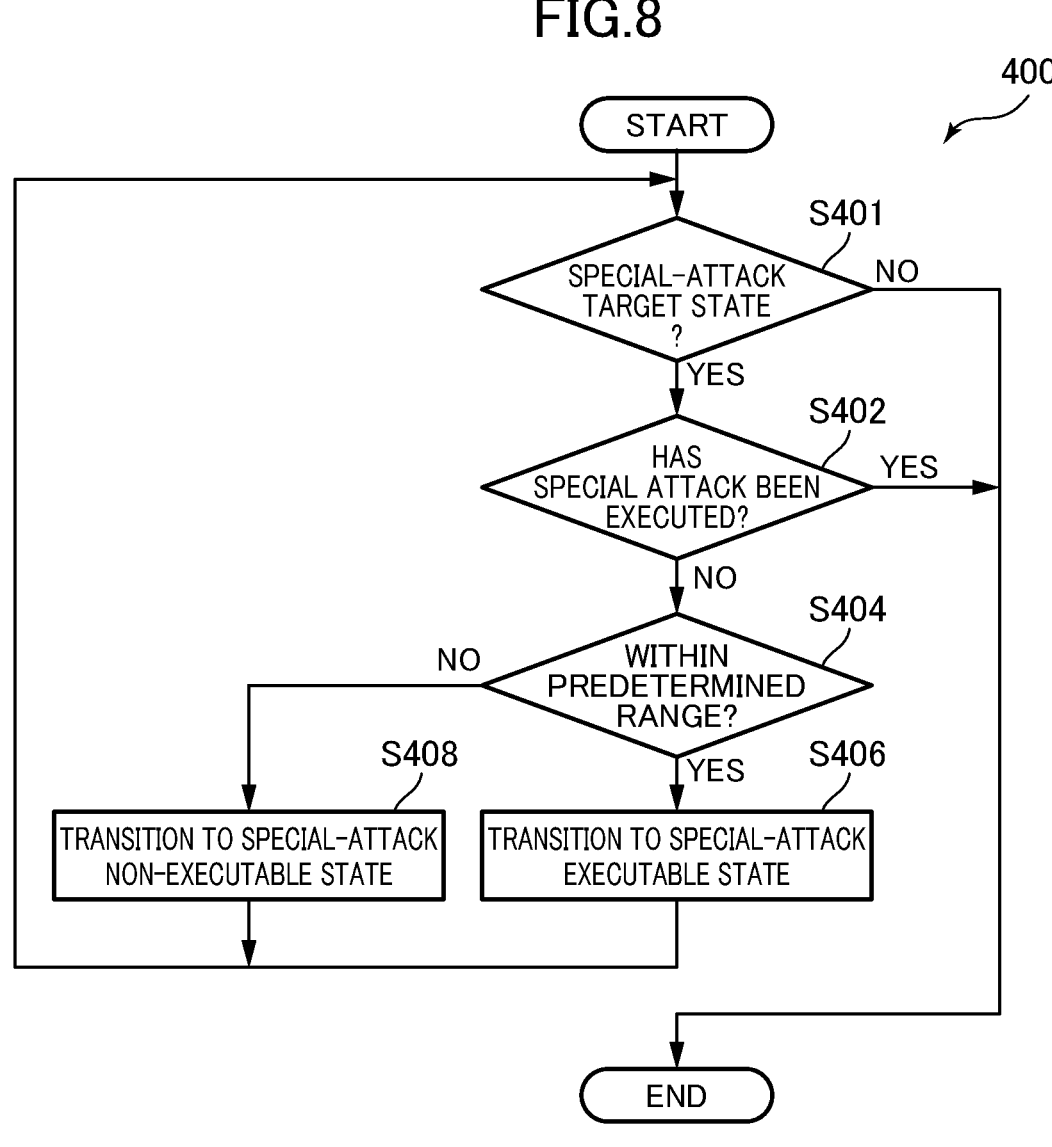
FIG. 8 is a flowchart showing special-attack executable state management processing according to the embodiment of the present invention.
Figure 9:
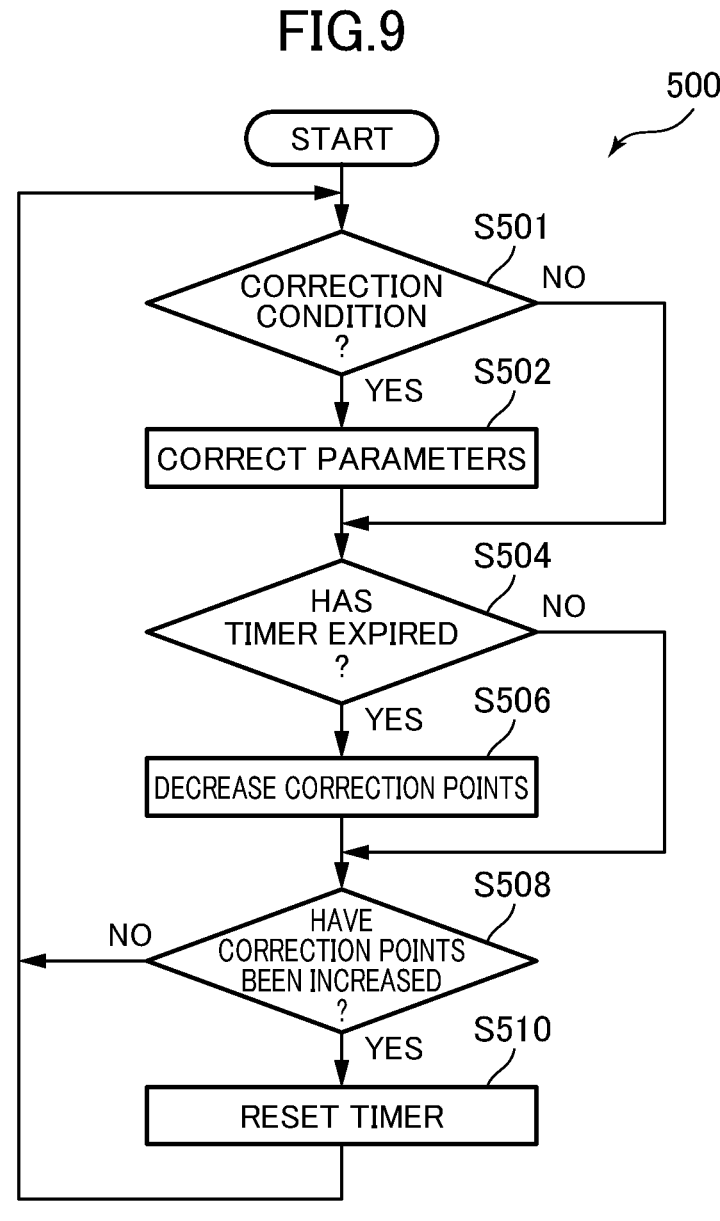
FIG. 9 is a flowchart showing correction-points/parameter-correction management processing according to the embodiment of the present invention.
Figure 10:
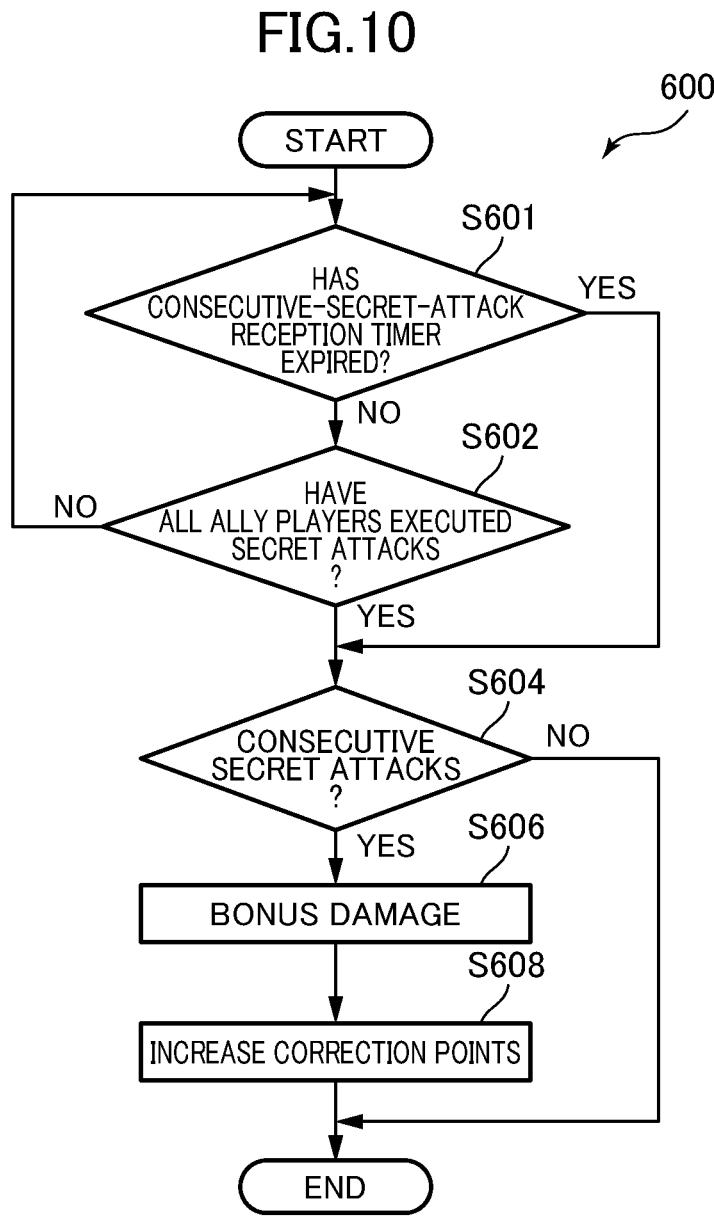
FIG. 10 is a flowchart showing consecutive-secret-attack management processing according to the embodiment of the present invention.

Next, information processing executed in the game system 1 according to the embodiment of the present invention will be described below by using FIGS. 5 to 10. FIG. 5 shows a flowchart of image display processing 100 for displaying an image for expressing the game state. FIG. 6 shows a flowchart of player-character control processing 200 based on an operation input for a player character. FIG. 7 shows a flowchart of special-attack target state management processing 300. FIG. 8 shows a flowchart of special-attack executable state management processing 400. FIG. 9 shows a flowchart of correction-points/parameter-correction management processing 500. FIG. 10 shows a flowchart of consecutive-secret-attack management processing 600.

First, the image display processing 100 will be described on the basis of FIG. 5. When the game is started, the electronic device 10 obtains the game state in order to generate a display image (S101). The game state includes parameters related to the game, which are generated by the game control unit 34 and the game management unit 44, and data that defines a game field. Then, the game control unit 34 generates an image for expressing the game state, on the basis of the obtained game state, and displays the image on the display unit 32 (S102).

The game state is decided on the basis of various parameters etc., and is changed on the basis of actions of the player characters, which are controlled by inputs from the individual players, and actions of non-player characters, which are controlled by the game management unit 44 etc. A plurality of processing procedures, including processing procedures to be described later using FIGS. 6 to 10, are executed in parallel with the image display processing 100, whereby the game state is updated. The electronic device 10 determines whether a game termination order has been issued from the game control unit 34 or the like (S104), and, until a termination order is issued, repeatedly executes Steps S101 and S102, thus continuing to display, on the display unit 32, an image expressing the game state updated through the other processing procedures. In this embodiment, a game machine is used as the electronic device 10, and a frame rate of 30 fps or 60 fps is generally set in the game machine. The electronic device 10 preferably executes the image display processing shown in FIG. 5 at intervals of a certain time in accordance with the frame rate.

Next, the player-character control processing 200 based on an operation input for the player character will be described on the basis of FIG. 6. In the following explanation, in processing executed with respect to not only a player character but also each of the ally characters including the player character, the term "ally character" is used to clarify the character to which the processing is applied. Furthermore, a person skilled in the art clearly understands that, even in processing in which the term "player character" is used, the same processing is executed also with respect to an ally non-player character, in some cases.

It is assumed that the player-character control processing 200 is executed by the game control unit 34. The parameters changed in respective steps are sent to the game management unit 44 by the game control unit 34 that has executed the respective steps and are supplied to all the electronic devices 10 via the game management unit 44, whereby the game proceeds on the basis of the common parameters. When the input unit 31 accepts a player input from the player (S201), control of the player character is executed on the basis of this input. Here, although it is assumed that the player input is any one of a movement command, a normal-attack command, a special-attack command, and a secret-attack command, the player input may also include another command.

The game control unit 34 determines whether the input player input is a movement command (S202). In the case where the input player input is a movement command, the game control unit 34 moves the position of the player character in the game field on the basis of a direction instruction or the like included in the player input (S204). For example, the coordinates are defined in the game field, and the coordinate position indicating the position of the player character in the game field is moved, by a predetermined amount, toward the direction instructed by the direction instruction included in the player input.

In the case where the player input is not a movement command, it is determined whether the player input is a normal-attack command (S206). Unlike attacks such as a special attack and a secret attack that can be executed only when the corresponding predetermined conditions are satisfied, the normal attack can be executed even when any predetermined condition is not satisfied. In the case where the player input is a normal-attack command, it is determined whether the normal attack has hit the enemy character (S208). This hit determination is performed, for example, by using the coordinates defined in the game field, on the basis of the position of the player character, the position of the enemy character, the direction in which the normal attack is executed, the shooting range of the normal attack, etc. The shooting range of the normal attack may be set depending on the type of the player character or may be set depending on the weapon etc. with which the player character is equipped.

In the case where it is determined that the attack by the player character has hit the enemy character, damage processing for the enemy character is executed (S210). The amount of damage to the enemy character is decided, for example, on the basis of the attacking power of the player character and the defensing power of the enemy character, and the HP of the enemy character is decreased by the decided amount of damage. In the case where the HP of the enemy character becomes 0 or less, the enemy character is made to disappear from the game field, and normal-attack processing based on this player input is terminated. If defeating the enemy character is a game termination condition, it is also possible to execute processing for terminating the game. It is assumed that processing for determining whether the game termination condition is satisfied is executed in parallel with other processing while the game is being executed, and, in the case where it is determined that the condition is satisfied, the other processing is stopped, and the game is terminated.

Next, it is determined whether the enemy character that has been hit by the attack from the player character is in the special-attack target state (S212). If the enemy character has already been in the special-attack target state, the flow returns to S201 in order to accept a next player input. In the case where it is determined that the enemy character is not in the special-attack target state, processing for decreasing the special value is executed (S214). Here, it is assumed that the special value of the enemy character is set to a predetermined value greater than 0 in the initial state, and the special-attack target state transition condition is that the special value thereof becomes 0 or less. The special value is decreased when an attack by an ally character is received, the special-attack target state transition condition is satisfied when the special value becomes 0 or less, and the parameter indicating the state of the enemy character is set to a parameter indicating the special-attack target state. In one modification, it is also possible that the special value is increased from the minimum value, and the state of the enemy character is transitioned to the special-attack target state when the special value becomes equal to or greater than a predetermined value.

The amount by which the special value is decreased may be always the same predetermined amount at the time of the normal attack or may be changed on the basis of another condition. For example, in the case where a normal attack by the player character hits the enemy character within a predetermined period since a normal attack by another ally character has hit the same enemy character, the special value may be decreased by a decrease amount to which an additional decrease amount has already been added as a bonus. Furthermore, it is also possible to increase the amount of bonus as the number of consecutive hits of attacks on the same enemy character becomes larger. In a multiplayer game in which a plurality of players cooperate to defeat an enemy character, the players attack the same enemy character in cooperation with each other, to allow more effective attacks than a case in which one player battles with the enemy character, thereby making it possible for the players to feel more fun in the multiplayer game and to enhance a sense of immersion in the game.

In the case where processing for decreasing the special value is not executed within the predetermined period, processing for increasing the special value is executed. For example, it is possible that processing for managing the special value is executed for each enemy character, and processing for decreasing the special value is monitored by using a timer used for increasing the special value; when the processing for decreasing the special value is executed within the predetermined period, the timer is reset; and, when the predetermined period has elapsed, the special value is increased, and the timer is reset. The special value is increased up to a preset upper limit value serving as the maximum value. The increase amount for the special value every predetermined time may be set in advance for each enemy character.

In one embodiment, in the case where a plurality of enemy characters are disposed in the game field, and one of the enemy characters is set in the special-attack target state, in the processing for decreasing the special value of the other enemy character, processing for decreasing the special value thereof to a value that satisfies the condition for transitioning to the special-attack target state is not executed. For example, in S214, processing for determining whether the enemy character other than the enemy character that has received an attack is in the special-attack target state is executed, and, if the enemy character other than the enemy character that has received an attack is not in the special-attack target state, the processing for decreasing the special value is executed.

On the other hand, in the case where the enemy character other than the enemy character that has received an attack is in the special-attack target state, the processing for decreasing the special value is executed such that the special value of the enemy character that has received an attack does not satisfy the special-attack target state transition condition. For example, in the case where it is determined that the special value satisfies the condition when the special value is 0 or less, the lower limit value of the special value is set to 1, so that the transition to the special-attack target state is not made even after the decrease processing.

Next, it is determined whether the special value of the enemy character has satisfied the special-attack target state transition condition (S216). In the case where the special value of the enemy character has not satisfied the special-attack target state transition condition, a next input from the player is awaited (S201). In the case where the special value of the enemy character has satisfied the special-attack target state transition condition, the state of the enemy character is transitioned to the special-attack target state, and a timer for the special-attack target state is started (S218). After Step S216 or S218, the flow returns to Step S201 in order to await a next player input.

It is assumed that, when a certain condition is satisfied, the special target attack target state is terminated and is returned to the normal state. Here, it is assumed that the state is returned to the normal state when a predetermined period has elapsed after the transition to the special-attack target state. The elapsed time is measured by using the timer for the special-attack target state.

The special-attack target state management processing 300 will be described below with reference to FIG. 7. It is assumed that the enemy character takes two states, i.e., the normal state and the special-attack target state. Enemy-character state transition processing is performed by using the special value and the parameter indicating the state, which are associated with the enemy character. In this embodiment, in Step S218, when the state of the enemy character is set to the special-attack target state, and the timer is started, the special-attack target state management processing 300 is started.

First, it is determined whether a special-attack reception time has expired (S301). For this determination, the timer for the special-attack target state, which is started in Step S218, is used. For example, it is possible that the initial value of the timer is set to 100 seconds, and, when 100 seconds have elapsed, it is determined that the special-attack reception time has expired. In the case where the timer indicates that the special-attack reception time has expired, the state parameter of the enemy character is set to the normal state in order to terminate the special-attack target state, thereby making a transition to the normal state (S308).

In the case where it is determined that the special-attack reception time has not expired (S301), it is determined whether special attacks by all the ally characters have been executed (S302). In the case where it is determined that special attacks by all the ally characters have been executed, the special-attack target state is terminated (S308). In this embodiment, it is assumed that each of the ally characters can execute only one special attack during one special-attack target state. For example, a flag indicating whether the special attack has been executed is associated with each of the ally characters, and the determination is made on the basis of whether the flags associated with all the ally characters indicate that the special attacks have been executed. In a modification, it is also possible to execute the special attack a predetermined number of times that is greater than two times or it is also possible not to set a limit on the number of times the special attack can be executed.

In the case where it is not determined that special attacks by all the ally characters have been executed (S302), it is determined whether the enemy character is dead (S304). In the case where the enemy character is dead, the special-attack target state is terminated (S308). In the case where the enemy character is not dead, it is determined whether a secret attack has hit (S306). In the case where one of the ally characters has executed a secret attack, and the secret attack has hit the enemy character, the special-attack target state is terminated (S308). Here, it is assumed that the secret attack of one ally character includes multiple attacks; when a secret start attack that is the first one of the attacks has hit, it is assumed that the secret attack has hit. In the case where the secret attack includes only one attack, that one attack is the secret start attack. This is because the secret attack is a very powerful attack, and, if the secret attack is made to contribute to the special attack and the following parameter correction, the advantage of the ally characters becomes too high, whereby it is hard to keep the balance between the enemy character and the ally characters. In one modification, even when the secret attack has hit, the special-attack state is not terminated.

The special-attack target state management processing 300 is repeatedly executed until the special-attack target state is terminated. The all-ally-character special-attack execution determination processing (S302), the enemy-character death determination processing (S304), and the secret-start-attack hit determination processing (S306) may be executed as interrupt processing. For example, it is possible that the all-ally-character special-attack execution determination processing is executed every time the special attack is executed by any of the ally characters, and, in the case where it is determined that the special attacks by all the ally characters have been executed, the special-attack-target-state termination processing (S308) is executed. Furthermore, similarly, it is also possible that the secret-start-attack hit determination processing is executed when the secret attack is executed, and, in the case where it is determined that the secret attack has hit, the special-attack-target-state termination processing (S308) is executed.

The description returns to the player-character control processing 200 of FIG. 6. In the case where it is determined that the player input is not a normal attack in Step S206, it is determined whether the player input is a special attack (S220). The special attack is an attack that can be executed by performing a predetermined input when the player character is in the special-attack executable state.

Here, the special-attack executable state management processing 400 for the ally characters will be described below by using FIG. 8. This management processing 400 is started when the state of the enemy character is transitioned to the special-attack target state, and is executed for each of the ally characters. First, it is determined whether the enemy character is still in the special-attack target state (S401). As described earlier, the state of the enemy character is transitioned from the special-attack target state to the normal state when the predetermined condition is satisfied. The state of this enemy character is monitored, and, in the case where the state of the enemy character is transitioned to the normal state, this processing is terminated.

In the case where it is determined that the enemy character is in the special-attack target state (S401), it is determined whether the ally character has executed a special attack (S402). As described earlier, for example, it is determined whether the special attack has been executed, on the basis of the flag associated with each of the ally characters. The flag can be reset when the enemy character is transitioned from the special-attack target state to the normal state. Furthermore, in the case where a plurality of enemy characters are allowed to be simultaneously transitioned to the special-attack target state, the flag may be set for each of the enemy characters.

In this embodiment, since only one special attack can be executed during one special-attack target state of the enemy character, in the case where it is determined that the special attack has been executed once (S402), the special-attack executable state management processing 400 is terminated, whereby this ally character is not allowed to execute any further special attacks.

In the case where it is determined that the special attack has not been executed (S402), it is determined whether the ally character is located within a predetermined range of the enemy character that is in the special-attack target state (S404). Whether the ally character is located within the predetermined range of the enemy character can be determined, for example, by determining whether the coordinates of the ally character are located within the range of a predetermined distance from the coordinates of the enemy character in the game field. The predetermined distance may be a virtual 3D distance or 2D distance.

In the case where it is determined that the ally character is located within the predetermined range of the enemy character that is in the special-attack target state (S404), the state of the ally character is transitioned to the special-attack executable state (S406). In the case where the ally character is already in the special-attack executable state, that state is maintained. In the case where it is determined that the ally character is not located within the predetermined range of the enemy character that is in the special-attack target state (S404), the state of the ally character is transitioned to a special-attack non-executable state (S408). In the case where the ally character is already in the special-attack non-executable state, that state is maintained.

In the case where the player character, which is the ally character, is in the special-attack executable state, an input button for executing the special attack is displayed on the display unit 32, thereby making it possible to indicate to the player that the special attack is executable and to encourage the player to execute the special attack. Then, in the case where the input button for executing the special attack is pressed during the special-attack executable state, a special-attack command is accepted as a player input, and the special attack is executed. Even when the input button for executing the special attack is pressed during the special-attack non-executable state, this is not accepted as a player input.

The description returns to the player-character control processing 200 of FIG. 6. If it is determined that the player input is a special-attack command (S220), the flag associated with the player character is set so as to indicate that the special attack has been executed (S222), and it is determined whether the special attack has hit the enemy character (S224). Whether the special attack has hit the enemy character is determined, for example, on the basis of the position of the player character, the position of the enemy character, the direction in which the special attack is executed, the shooting range of the special attack, etc., in the game field. The shooting range of the special attack may be set depending on the type of the player character or may be set depending on the weapon equipped on the player character. The shooting range of the special attack may be the same as or different from that of the normal attack.

It is possible that an attack by the enemy character does not hit the ally character that is executing the special attack. It is assumed that action processing of the enemy character is executed in parallel with the processing 200, and, in the case where it is determined that an attack by the enemy character has hit the player character, an action that is being executed on the basis of an input of the player character is stopped. For example, if an attack by the enemy character has hit the player character while the player character executes movement processing on the basis of a player's movement command, the movement processing is stopped, and a next player input is awaited (S201).

In this embodiment, even though an attack on the ally character by the enemy character is executed in the action processing of the enemy character, if the ally character is executing a special attack, hit determination for the attack by the enemy character is not performed. Furthermore, it is assumed that a special attack is determined to hit only the enemy character that is in the special-attack target state and does not hit the enemy character that is not in the special-attack target state.

In the case where the special attack did not hit, the special attack has failed, and the flow returns to the reception processing for a next player input (S201). In the case where the special attack has hit, processing for inflicting damage on the enemy character is executed (S226). In the same way as the normal attack, the amount of damage to be inflicted on the enemy character is decided on the basis of the attacking power of the player character and the defensing power of the enemy character, for example, and the HP of the enemy character is decreased by the decided amount of damage. In order to increase the amount of damage to be inflicted on the enemy character compared with the normal attack, it is also possible to calculate damage by adding a bonus value to the attacking power of the player character or by doubling the attacking power thereof. It is also possible to inflict damage that is predetermined times the damage inflicted by the normal attack. In one modification, it is also possible that the special attack is involved in only correction points, to be described later, and damage processing for the enemy character is not executed.

Next, processing for increasing the correction points is executed (S228). The correction points serve as a parameter that is associated with the whole of the ally characters and that is common to the whole of the ally characters. The amount of increase in the correction points may be a fixed amount or may be decided on the basis of a predetermined condition. For example, the correction points may be increased by the basic increase amount, which is added when the special attack is made to hit, and, in addition, bonus points in accordance with the number of times the special attack is made to hit the enemy character during one special-attack target state of the enemy character. The increase in the correction points may be realized by adding a predetermined amount or realized through multiplication or another calculation.

For example, it is possible that the basic increase amount is set to 1000 points, and a bonus of 2000 points ($2 \times 1000$) for the special attack hit for the second time is added to the basic increase amount, whereby the correction points are increased by 3000 points. Furthermore, in this embodiment, the correction points are increased also when consecutive secret attacks succeed and after bonus damage is inflicted after completion of the consecutive secret attacks. For example, when consecutive secret attacks succeed, the correction points are increased, for each secret attack, by 1000 points×the number of times of consecutive secret attacks. After bonus damage is inflicted after completion of the consecutive secret attacks, the correction points can also be increased by 1000 points×the number of times of consecutive secret attacks.

Here, the correction-points/parameter-correction management processing 500 will be described below by using FIG. 9. This management processing 500 is started when the game is started, and is executed as processing common to all the ally characters, and the correction points and the correction level are managed as parameters common to all the ally characters.

First, it is determined whether the correction points satisfy a correction condition (S501). Here, the correction condition includes conditions at multiple stages, and one example thereof is shown in Table 1. The correction condition includes a plurality of correction levels and thresholds set for the individual correction levels. It is assumed that levels 0 to 5 are prepared as correction levels.

TABLE 1

| Correction-level change condition | | |
|---|---|---|
| Level | Decrease threshold | Increase threshold |
| 0 | 0 | 1000 |
| 1 | 0 | 1000 |
| 2 | 0 | 2000 |
| 3 | 0 | 3000 |
| 4 | 0 | 4000 |
| 5 | 0 | — |

In Table 1, a level indicates a correction level, and a threshold indicates correction points required to make a transition to the next correction level. In each of the correction levels, when the correction points fall between a decrease threshold and an increase threshold, that correction level is maintained; when the correction points are increased beyond the increase threshold, the correction condition to increase the correction level is satisfied, whereby the correction level is increased to the next correction level; and, when the correction points become less than the decrease threshold, the correction condition to decrease the correction level is satisfied, whereby the correction level is decreased to the immediately lower correction level.

For example, since the increase threshold is set to 1000 in the correction level 1, when the correction points are increased to 1000 points or more in the state of the correction level 1, it is determined that the correction condition to increase the correction level to 2 has been satisfied, whereby the correction level is increased to 2. On the other hand, when the correction points are less than the decrease threshold (0) in the state of the correction level 2, it is determined that the correction condition to decrease the correction level to 1 has been satisfied, whereby the correction level is decreased to 1. In the case where the correction level is increased, the correction points are set to 0. In the case where the correction level is decreased, the correction points are set to the increase threshold in the correction level to which the correction level has been decreased. In the lowest correction level 0, the correction level is not decreased to a lower correction level, and, in the highest correction level 5, the correction level is not increased to a higher correction level.

In this embodiment, in the case of the correction level 5, it is assumed that the correction points do not take a value greater than 0. Thus, when a correction-point timer, to be described later, has expired, and the correction points are decreased, the correction points immediately become less than the decrease threshold (0), whereby the correction level is decreased to the correction level 4. The correction-point timer is reset when an attack on the enemy character succeeds before the correction-point timer expires, thereby making it possible to prevent the correction level from being decreased.

In Step S501, if it is determined that the correction points satisfy the correction condition, the parameters of the ally characters are corrected (S502). In correcting the parameters, for example, the attacking powers of all the ally characters can be changed by a fixed percentage. Here, the correction condition includes both a correction condition to perform favorable correction on the ally characters and a correction condition to perform unfavorable correction so as to reset the favorable correction.

For example, in the case where the correction condition to increase the attacking powers of the ally characters is satisfied, parameter correction processing for increasing the attacking powers of the ally characters is executed, and, in the case where the correction condition to reset the increased attacking powers is satisfied, parameter correction processing for decreasing the attacking powers of the ally characters to the original values before increased is executed.

As shown in Table 2, it is also possible to change the increase amount according to the correction level. Correction of the parameters is not limited to an increase in the attacking powers but may be an increase in the defensing powers, or it is also possible to adopt another parameter correction method favorable to the ally characters, such as a method in which the amount of hit points, which is decreased due to a state of being poisoned, is decreased. In the case where there is an ally character of which the attacking power is increased as the hit points thereof are lower, a parameter correction method for decreasing the hit points may be adopted.

TABLE 2

| Correction level vs. parameter correction amount | |
|---|---|
| Level | Correction content |
| 0 | —(No correction) |
| 1 | Increase attacking powers of all ally characters by 5% |
| 2 | Increase attacking powers of all ally characters by 10% |
| 3 | Increase attacking powers of all ally characters by 20% |
| 4 | Increase attacking powers of all ally characters by 30% |
| 5 | Increase attacking powers of all ally characters by 40% |

Next, it is determined whether the correction-point timer has expired (S504). In the case where the correction-point timer has expired, the correction points are decreased on the basis of the elapsed time since the timer has expired (S506). As shown in Table 3, the expiration time for starting to decrease the correction points and the decrease rate after starting to decrease the correction points can be set for each correction level. For example, in the case of the correction level 3, when 10 seconds have elapsed since the correction-point timer is reset, decrease of the correction points is started, and thereafter, the correction points are decreased by 600 points per second. Decrease of the correction points may be realized through subtraction of a predetermined amount or may be realized by using another calculation such as division.

TABLE 3

| Correction-points decrease condition | | |
|---|---|---|
| Level | Expiration time | Decrease rate |
| 0 | — | — |
| 1 | 5 seconds | 200/second |
| 2 | 5 seconds | 400/second |
| 3 | 10 seconds | 600/second |
| 4 | 10 seconds | 800/second |
| 5 | 15 seconds | 1000/second |

In Step S508, it is determined whether correction-points increase processing has been executed. The correction points are increased in the case where an attack on the enemy character has hit, in the case where the consecutive secret attacks have hit, etc. In the case where it is determined that the processing for increasing the correction points has been executed, the correction-point timer is reset (S510). Correction-point-timer management processing may also be executed by a process processed independently and in parallel.

After it is determined that the correction points have not been increased (S508) or after the correction-point timer is reset (S510), the flow returns to Step S501, and Steps S501 to S510 are repeatedly executed.

A plurality of ally characters get close to the enemy character that is in the special-attack target state, and special attacks are sequentially and timely executed during the special-attack reception time, thereby making it possible to efficiently increase the correction points. It is possible to make the player feel the fun of being in timely coordination with the other ally character(s), and it is also possible to get the player to more concentrate on the play by limiting the reception time, to improve a sense of immersion in the game.

The description returns to the player-character control processing 200 of FIG. 6. In Step S220, in the case where it is determined that the player input is not a special attack, it is determined that the player input is a secret attack, and it is determined whether the secret attack has hit (S230). In this embodiment, it is assumed that the player input is any one of a movement command, a normal-attack command, a special-attack command, and a secret-attack command, and, in the case where the player input is not any of a movement command, a normal-attack command, and a special-attack command, it is determined that the player input is a secret-attack command.

In the case where the secret attack did not hit, the secret attack has failed, and the flow returns to the reception processing for a next player input (S201). In the case where the secret attack has hit, processing for inflicting damage on the enemy character is executed. Although the amount of damage to be inflicted on the enemy character is decided on the basis of the attacking power of the player character and the defending power of the enemy character, for example, it is also possible to inflict damage that is a predetermined number of times greater than the damage inflicted by the normal attack, in order to inflict damage greater than that inflicted by the normal attack.

Furthermore, in Step S234, the consecutive-secret-attack processing is executed. For example, a consecutive-secret counter that counts the consecutive number of consecutive secret attacks and a consecutive-secret-attack reception timer are set as parameters common to the ally characters. It is indicated that a secret attack made when the consecutive-secret counter shows 0 is the first secret attack and that a secret attack made when the consecutive-secret counter shows 1 or more is not the first secret attack. It is assumed that, when a predetermined period has elapsed, the consecutive-secret-attack reception timer is expired, and the reception period is expired.

In the consecutive-secret-attack processing (S234), when the consecutive-secret counter shows 0, the consecutive-secret-attack reception timer is started, the consecutive-secret-attack counter is set to 1, a secret-attack-executed flag associated with this player character is set to on, and the consecutive-secret-attack management processing 600, to be described later by using FIG. 10, is started. When the consecutive-secret-attack counter shows 1 or more, the consecutive-secret-attack counter is incremented.

Furthermore, the correction points are increased according to the number of consecutive secret attacks. For example, the correction points can be increased by the value obtained by multiplying the number of the consecutive-secret-attack counter by 1000 points. Then, the flow returns to the reception processing for a next player input (S201).

The consecutive-secret-attack management processing 600 will be described below by using FIG. 10. As described above, through the consecutive-secret-attack processing in Step S234, when the consecutive-secret-attack counter shows 0, the consecutive-secret-attack reception timer is started, and the consecutive-secret-attack management processing 600 is started. It is assumed that, when a predetermined period has elapsed, the consecutive-secret-attack reception timer has expired, and the reception period has expired.

First, in Step S601, it is determined whether the consecutive-secret-attack reception timer has expired. In the case where the reception timer has not expired, it is determined whether all the ally characters have executed secret attacks (S602). Whether the ally characters have executed secret attacks is determined, for example, by determining whether the secret-attack-executed flags of the individual ally characters have been set to on.

Execution of secret attacks of the ally characters delayed until it is determined that the timer has expired (S601) or it is determined that all the ally characters have executed the secret attacks (S602). When it is determined that at least one of the determinations is affirmative, next, it is determined whether the consecutive secret attacks have succeeded (S604). It can be determined that the consecutive secret attacks have succeeded when the consecutive-secret counter shows 2 or more, and it can be determined that the consecutive secret attacks have not succeeded when the counter shows 1.

In the case where it is determined that the consecutive secret attacks have succeeded, a bonus damage due to an additional secret attack through the consecutive secret attacks is further inflicted on the enemy character (S606), and the correction points are also increased (S608). For example, the correction points can be increased by the value obtained by multiplying the consecutive-secret counter by 1000 points. Then, the consecutive-secret-attack management processing 600 is terminated.

By using this embodiment, when the special value of the enemy character is decreased to get the enemy character in the special-attack target state through cooperation with the ally characters, the special attack succeeds, while the enemy character is in the special-attack target state, to increase the correction points, and the correction condition is satisfied to correct the parameters associated with the ally characters, whereby it is possible to battle with the enemy character in a favorable manner. Furthermore, the decrease amount of the special value and the increase amount of the correction points are increased through cooperation with the ally characters, whereby it is possible to proceed with the battle in a favorable manner.

By obtaining a favorable effect that cannot be obtained by the skill of the player alone, the player feels the importance of cooperation with the ally character(s), is provided with motivation to cooperate, and can feel the fun when the cooperation succeeds. In particular, in the case where the ally characters are player characters operated by the other players, the game is played while making a strategy in order to cooperate with the other players, thereby enabling the player to enjoy communications with the other players. Furthermore, the player is requested to perform a timely coordination, thereby making it possible to get the player to concentrate more on the game and to enhance the sense of immersion in the game. The player can feel the deep fun that can be obtained by the multiplayer game and that cannot be obtained only by pursuing an individual skill. Furthermore, the charm of the characters can be produced by expressing cooperation between the ally characters.

In one modification, instead of the correction processing for the parameters associated with the ally characters, which is executed in the case where the correction points satisfy the correction condition, it is also possible to execute correction processing for the parameter associated with the enemy character.

The parameter of the enemy character to be corrected can be, for example, the attacking power or the defensing power of the enemy character. The attacking power or the defensing power of the enemy character can be decreased through correction. Furthermore, the correction also includes a limitation of actions that can be executed by the enemy character to a predetermined action(s). Among action identifiers indicating actions that can be executed by the enemy character, some action identifiers can be made unselectable. By decreasing the attacking power or the defensing power of the enemy character or by limiting the actions, it is possible that the ally characters take actions in a favorable manner. Furthermore, as the processing for correcting the parameter of the enemy character, it is also possible to reduce the animation playback speed of the enemy character. Since the action of the enemy character looks slow from the player, it is possible to play the game more favorably than at the normal speed.

In another modification, in addition to the correction processing for the parameters associated with the ally characters, it is also possible to execute correction processing for the parameter associated with the enemy character. After the correction level reaches the maximum correction level due to the special attack by the player, during the period in which the maximum correction level is maintained, it is further possible to transition the enemy character to the special-attack target state. When special attacks by the ally players succeed a predetermined number of times or more during the period of the special-attack target state, the parameter associated with the enemy character is corrected. Here, the special attack and the special-attack target state for satisfying the condition to correct the parameters associated with the ally characters are referred to as a first special attack and a first special-attack target state, and the special attack and the special-attack target state for satisfying the condition to correct the parameter associated with the enemy character are referred to as a second special attack and a second-special-attack target state.

For example, when the first special attack is executed during the first special-attack target state, and the correction level reaches the maximum correction level (Steps S220 to S228), the special value of the enemy character is reset. Then, through processing similar to Steps S206 to S218, when the special value of the enemy character is decreased by the attack by the ally character, and the special value becomes 0 or less while the correction level is maintained in the maximum correction level, the enemy character is transitioned to the second-special-attack target state. Then, special-attack hit determination and enemy damage processing are executed through processing similar to Steps S220 to S226. The ally character that is located within a predetermined range of the enemy character in the game field is set in a state of being able to execute the second special attack, and the ally character executes the second special attack in the state of being able to execute the second special attack. It is determined whether the executed second special attack has succeeded a predetermined number of times or more. If it is determined that the second special attack has succeeded the predetermined number of times or more, the parameter associated with the enemy character is corrected.

The predetermined number of times can be equal to the number of ally characters, for example. It is assumed that the number of second special attacks that can be executed by each of the ally characters is set to one during one second-special-attack reception period, and, if all the ally characters succeed in the second special attack, the parameter associated with the enemy character can be corrected. It is also possible that each of the ally characters can execute the special attack two times or more during one second-special-attack reception period. Furthermore, the predetermined number of times may also be one or may also be another integer that is not equal to the number of ally characters.

In one modification, transmission and reception of information related to the individual parameters etc. may be performed, not through the server 20, but through peer-to-peer (PtoP) communication between the electronic devices 10. In that case, the function of the game management unit 44 of the server 20 may be provided in each of the electronic devices 10 or may be provided in one of the electronic devices 10. In another modification, it is also possible that the electronic device 10 is operated in a stand-alone state without communicating with the server 20 and the other electronic device(s) 10. In that case, the number of players may be one, or the game can be played by a plurality of players by using one electronic device 10 that accepts player inputs from the plurality of players. This can be executed when the one electronic device 10 includes all the functions.

In another embodiment of the present invention, it is also possible to provide: a program that realizes the functions and the information processing steps shown in the flowcharts in the above-described embodiment of the present invention; and a computer-readable storage medium that has stored the program. Furthermore, in still another embodiment, it is also possible to provide a method for realizing the functions and the information processing steps shown in the flowcharts in the above-described embodiment of the present invention. Furthermore, in still another embodiment, it is also possible to provide a server capable of supplying, to a computer, a program that realizes the functions and the information processing steps shown in the flowcharts in the above-described embodiment of the present invention. Furthermore, in still another embodiment, it is also possible to provide a virtual machine that realizes the functions and the information processing steps shown in the flowcharts in the above-described embodiment of the present invention.

The processing, operation, or subject described above can be modified freely as long as no inconsistency arises in the processing, operation, or subject, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10: electronic device
11: processor
12: display device
13: input device
14: storage device
15: communication device
16: bus 20: server
21: processor
22: display device
23: input device
24: storage device
25: communication device
26: bus
31: input unit
32: display unit
33: communication unit
34: game control unit
41: input unit
42: display unit
43: communication unit
44: game management unit
50: game screen
51 to 54: ally character
55: enemy character
60: ally-character information region
65: correction information region
66: gauge

The invention claimed is:

1. A non-transitory computer readable medium storing a program, wherein the program is configured to cause an electronic device to perform a method comprising:

displaying, by a display device in the electronic device, a game screen for a computer game, wherein the game screen comprises an ally-character information region for a plurality of ally characters comprising a player character, a correction information region indicating a plurality of correction points and a correction level, and a game field, wherein the plurality of ally characters are disposed with an enemy character in the game field, and wherein the plurality of correction points are common to the plurality of ally characters; and executing the computer game using the game screen and a plurality of player inputs to an input device in the electronic device, wherein executing the computer game comprises:

operating, based on a first player input among the plurality of player inputs, the player character in a battle with the enemy character within the game field, wherein at least one non-player character among the plurality of ally characters cooperates with the player character against the enemy character;

determining whether the enemy character is in a special-attack target state in which the enemy character becomes a target of a special attack;

setting an ally character among the plurality of ally characters that is disposed within a predetermined range of the enemy character in the game field in a state of being able to execute the special attack in response to the enemy character being in the special-attack target state;

executing, based on a second player input among the plurality of player inputs and using the ally character, the special attack in the state of being able to execute the special attack;

determining, while performing the battle with the enemy character, whether the special attack has succeeded;

increasing the plurality of correction points to produce a first plurality of updated correction points in response to the special attack succeeding during the battle with the enemy character, wherein the first plurality of updated correction points are displayed in the correction information region of the game screen while executing the computer game;

decreasing the first plurality of updated correction points in accordance with a period during which the first plurality of updated correction points are not increased during the battle with the enemy character to produce a second plurality of updated correction points, wherein the second plurality of updated correction points are displayed in the correction information region of the game screen while executing the computer game; and correcting a plurality of parameters associated with the plurality of ally characters at a predetermined rate common to of the plurality of ally characters in response to the second plurality of updated correction points satisfying a correction condition.

2. The non-transitory computer readable medium according to claim 1, wherein the correction condition comprises a plurality of conditions in multiple stages, and wherein correcting the plurality of parameters comprises correcting the plurality of parameters based on a stage of the correction condition satisfied by the second plurality of updated correction points.

3. The non-transitory computer readable medium according to claim 1, wherein the method further comprises:

changing a special value that is set for the enemy character, when an attack on the enemy character by any of the plurality of ally characters has succeeded; and transitioning the enemy character to the special-attack target state when the special value satisfies a special-attack target state transition condition, wherein, in response to the enemy character being in the special-attack target state, the number of times each of the plurality of ally characters can execute the special attack is equal to or less than a predetermined number of times.

4. The non-transitory computer readable medium according to claim 3, wherein changing the special value comprises increasing an amount of change in the special value in response to, after an attack by one of the plurality of ally characters on the enemy character has succeeded, an attack by another one of the plurality of ally characters on the enemy character has succeeded within a predetermined period.

5. The non-transitory computer readable medium according to claim 3, wherein a plurality of enemy characters are disposed in the game field in the computer game;

wherein the special value is set for each of the plurality of enemy characters; and wherein in response to one of the plurality of enemy characters being in the special-attack target state, even when an attack by any of the plurality of ally characters on any of the other enemy characters has succeeded, a change that makes the special value thereof satisfy the special-attack target state transition condition is not executed.

6. The non-transitory computer readable medium according to claim 1, wherein the method further comprises:

determining, while the plurality of parameters associated with the plurality of ally characters are being corrected, whether the enemy character is in a second-specialattack target state in which the enemy character becomes a target of a second special attack;

setting the ally character that is disposed within a predetermined range of the enemy character in the game field, in a state of being able to execute the second special attack, if it is determined that that the enemy character is in the second-special-attack target state, in which the enemy character becomes a target of the second special attack;

allowing the ally character to execute the second special attack in the state of being able to execute the second special attack;

determining whether the second special attack has succeeded a predetermined number of times or more; and correcting a parameter associated with the enemy character in response to determining that the second special attack has succeeded the predetermined number of times or more.

7. A method comprising:

displaying, by a display device in a terminal device, a game screen for a computer game, wherein the game screen comprises an ally-character information region for a plurality of ally characters comprising a player character, a correction information region indicating a plurality of correction points and a correction level, and a game field, wherein the plurality of ally characters are disposed with an enemy character in the game field, and wherein the plurality of correction points are common to the plurality of ally characters; and executing, by the terminal device, the computer game using the game screen and a plurality of player inputs to an input device in the terminal device, wherein executing the computer game comprises:

operating, based on a first player input among the plurality of player inputs, the player character in a battle with the enemy character within the game field, wherein at least one non-player character among the plurality of ally characters cooperates with the player character against the enemy character;

determining whether the enemy character is in a special-attack target state in which the enemy character becomes a target of a special attack;

setting an ally character among the plurality of ally characters that is disposed within a predetermined range of the enemy character in the game field in a state of being able to execute the special attack in response to the enemy character being in the special-attack target state;

executing, based on a second player input among the plurality of player inputs and using the ally character, the special attack in the state of being able to execute the special attack;

determining, while performing the battle with the enemy character, whether the special attack has succeeded;

increasing the plurality of correction points to produce a first plurality of updated correction points in response to the special attack succeeding during the battle with the enemy character, wherein the first plurality of updated correction points are displayed in the correction information region of the game screen while executing the computer game;

decreasing the first plurality of updated correction points in accordance with a period during which the first plurality of updated correction points are not increased during the battle with the enemy character to produce a second plurality of updated correction points, wherein the second plurality of updated correction points are displayed in the correction information region of the game screen while executing the computer game; and correcting a plurality of parameters associated with the plurality of ally characters at a predetermined rate common to the plurality of ally characters in response to the second plurality of updated correction points satisfying a correction condition.

8. An electronic device comprising:

a display device;

an input device;

a processor; and a memory comprising a program, wherein the program, when executed by the processor, is configured to perform a method comprising:

displaying, by the display device, a game screen for a computer game, wherein the game screen comprises an ally-character information region for a plurality of ally characters comprising a player character, a correction information region indicating a plurality of correction points and a correction level, and a game field, wherein the plurality of ally characters are disposed with an enemy character in the game field, and wherein the plurality of correction points are common to the plurality of ally characters; and executing the computer game using the game screen and a plurality of player inputs to the input device, wherein executing the computer game comprises:

operating, based on a first player input among the plurality of player inputs, the player character in a battle with the enemy character within the game field, wherein at least one non-player character among the plurality of ally characters cooperates with the player character against the enemy character;

determining whether the enemy character is in a special-attack target state in which the enemy character becomes a target of a special attack;

setting an ally character among the plurality of ally characters that is disposed within a predetermined range of the enemy character in the game field in a state of being able to execute the special attack in response to the enemy character being in the special-attack target state;

executing, based on a second player input among the plurality of player inputs and using the ally character, the special attack in the state of being able to execute the special attack;

determining, while performing the battle with the enemy character, whether the special attack has succeeded;

increasing the plurality of correction points to produce a first plurality of updated correction points in response to the special attack succeeding during the battle with the enemy character, wherein the first plurality of updated correction points are displayed in the correction information region of the game screen while executing the computer game;

decreasing the first plurality of updated correction points in accordance with a period during which the first plurality of updated correction points are not increased during the battle with the enemy character to produce a second plurality of updated correction points, wherein the second plurality of updated correction points are displayed in the correction information region of the game screen while executing the computer game; and correcting a plurality of parameters associated with the plurality of ally characters at a predetermined rate common to the plurality of ally characters in response to the second plurality of updated correction points satisfying a correction condition.

9. A non-transitory computer readable medium storing a program, wherein the program is configured to cause an electronic device to perform a method comprising:

displaying, by a display device in the electronic device, a game screen for a computer game, wherein the game screen comprises an ally-character information region for a plurality of ally characters comprising a player character, a correction information region indicating a plurality of correction points and a correction level, and a game field, wherein the plurality of ally characters are disposed with an enemy character in the game field, and wherein the plurality of correction points are common to the plurality of ally characters; and executing the computer game using the game screen and a plurality of player inputs to an input device in the electronic device, wherein executing the computer game comprises:

operating, based on a first player input among the plurality of player inputs, the player character in a battle with the enemy character within the game field, wherein at least one non-player character among the plurality of ally characters cooperates with the player character against the enemy character;

determining whether the enemy character is in a special-attack target state in which the enemy character becomes a target of a special attack;

setting an ally character among the plurality of ally characters that is disposed within a predetermined range of the enemy character in the game field in a state of being able to execute the special attack in response to the enemy character being in the special-attack target state;

executing, based on a second player input among the plurality of player inputs and using the ally character, the special attack in the state of being able to execute the special attack;

determining, while performing the battle with the enemy character, whether the executed special attack has succeeded a predetermined number of times or more; and correcting a parameter associated with the enemy character in response to determining that the special attack has succeeded the predetermined number of times or more.

* * * * *